United States Patent
Daniels et al.

(10) Patent No.: US 8,544,716 B2
(45) Date of Patent: Oct. 1, 2013

(54) REPAIR OF TURBINE COMPONENTS AND SOLDER ALLOY THEREFOR

(75) Inventors: Bernd Daniels, Groebenzell (DE); Michael Hillen, Olching (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 13/388,434

(22) PCT Filed: Aug. 5, 2010

(86) PCT No.: PCT/DE2010/000919
§ 371 (c)(1),
(2), (4) Date: Feb. 1, 2012

(87) PCT Pub. No.: WO2011/015192
PCT Pub. Date: Feb. 10, 2011

(65) Prior Publication Data
US 2012/0125979 A1    May 24, 2012

(30) Foreign Application Priority Data
Aug. 6, 2009   (DE) .......................... 10 2009 036 405

(51) Int. Cl.
*B23K 31/02*   (2006.01)
*B23P 6/00*    (2006.01)

(52) U.S. Cl.
USPC ........... 228/119; 228/200; 228/246; 29/889.1

(58) Field of Classification Search
None
See application file for complete search history.

(56) References Cited

U.S. PATENT DOCUMENTS

| 3,713,206 A | 1/1973 | Galmiche et al. |
| 4,008,844 A | 2/1977 | Duvall et al. |
| 4,842,953 A | 6/1989 | Perkins et al. |
| 5,066,459 A | 11/1991 | Beltran et al. |
| 5,156,321 A | 10/1992 | Liburdi et al. |
| 5,182,080 A | 1/1993 | Beltran et al. |
| 5,561,827 A | 10/1996 | Reeves et al. |
| 5,569,546 A * | 10/1996 | Ferrigno et al. .............. 428/668 |

(Continued)

FOREIGN PATENT DOCUMENTS

| CA | 2 496 189 A1 | 8/2005 |
| CA | 2 520 681 A1 | 4/2006 |

(Continued)

OTHER PUBLICATIONS

German Search Report, dated May 27, 2010, 5 pages total.

(Continued)

*Primary Examiner* — Kiley Stoner
(74) *Attorney, Agent, or Firm* — Crowell & Moring LLP

(57) ABSTRACT

A method for repairing a component of a gas turbine and a solder alloy are disclosed. In an embodiment, the method includes applying the solder alloy to the component in an area of the component having a punctiform damage or a linear imperfection, where the solder alloy is a mixture of a NiCoCrAlY alloy and a Ni-based solder. A molded repair part made of the solder alloy is applied to the component in an area of the component having a planar defect. The component is heat treated to solder the molded repair part on the component and to solder the solder alloy applied to the component in the area of the component having the punctiform damage or the linear imperfection. The component is cooled after the heat treating and, following the cooling, the component is further heat treated.

6 Claims, 2 Drawing Sheets

(56) References Cited

U.S. PATENT DOCUMENTS

| | | | |
|---|---|---|---|
| 5,628,814 A | 5/1997 | Reeves et al. | |
| 5,666,643 A | 9/1997 | Chesnes et al. | |
| 5,705,281 A | 1/1998 | Reeves et al. | |
| 6,391,252 B1 | 5/2002 | David et al. | |
| 6,503,349 B2 | 1/2003 | Pietruska et al. | |
| 2001/0052375 A1 | 12/2001 | Sievers et al. | |
| 2005/0067466 A1* | 3/2005 | Boegli et al. | 228/119 |
| 2005/0274009 A1 | 12/2005 | Powers | |
| 2006/0013717 A1 | 1/2006 | Beck | |
| 2006/0071053 A1* | 4/2006 | Garimella | 228/119 |
| 2006/0134454 A1 | 6/2006 | Sathian | |
| 2006/0174482 A1 | 8/2006 | Roedl et al. | |
| 2006/0248718 A1* | 11/2006 | Szela et al. | 29/889.1 |
| 2007/0039177 A1* | 2/2007 | Yoshioka et al. | 29/889.1 |
| 2007/0283560 A1* | 12/2007 | Malley | 29/889.1 |
| 2008/0017694 A1* | 1/2008 | Schnell et al. | 228/119 |
| 2011/0135489 A1* | 6/2011 | Strangman | 416/241 R |

FOREIGN PATENT DOCUMENTS

| | | |
|---|---|---|
| CA | 2 581 908 A1 | 9/2007 |
| DE | 32 37 776 C2 | 4/1983 |
| DE | 37 85 424 T2 | 10/1993 |
| DE | 690 31 632 T2 | 5/1998 |
| DE | 699 20 257 T2 | 1/2005 |
| DE | 697 32 397 T2 | 1/2006 |
| EP | 0 270 785 A2 | 6/1988 |
| EP | 0 800 889 B1 | 10/1997 |
| EP | 1 197 290 A2 | 4/2002 |
| EP | 1 258 312 A2 | 11/2002 |
| EP | 1 790 745 A1 | 5/2007 |
| EP | 1 818 132 A2 | 8/2007 |
| GB | 2 409 210 A | 6/2005 |
| KR | 1020010104662 | 11/2001 |
| WO | WO 2007/031400 A1 | 3/2007 |

OTHER PUBLICATIONS

PCT/DE2010/000919 PCT/ISA/210, dated Nov. 17, 2010, 3 pages.

* cited by examiner

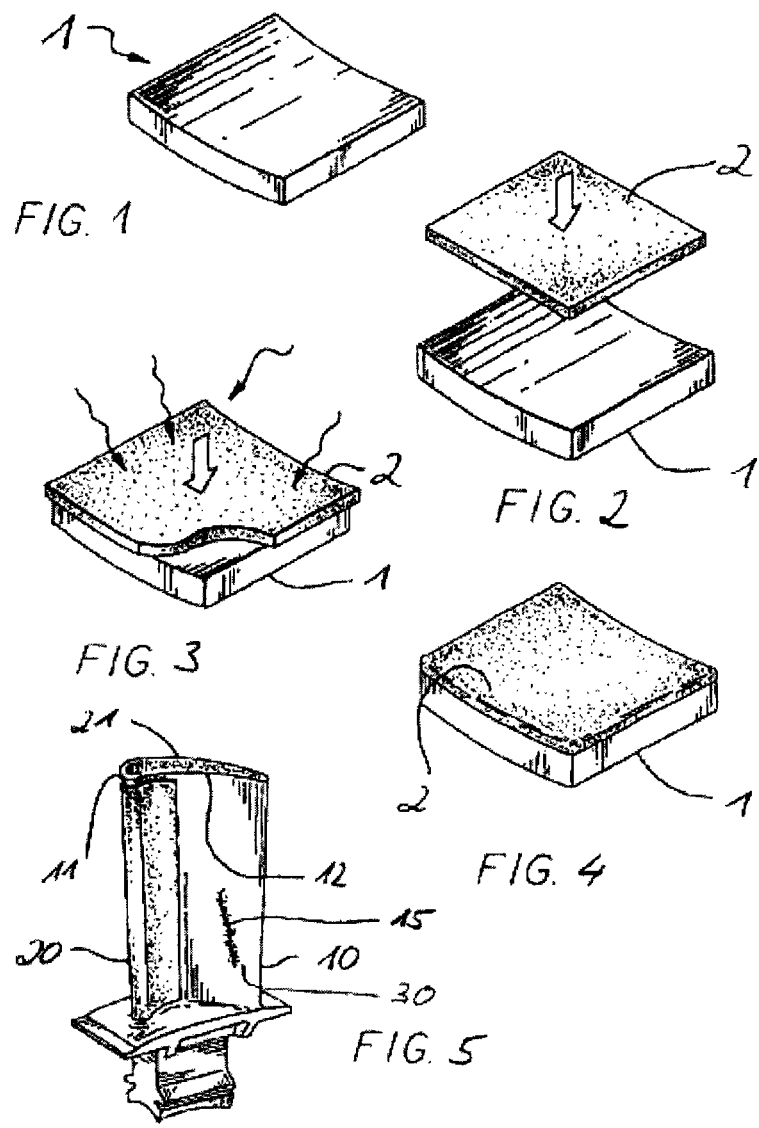

REPAIR OF TURBINE COMPONENTS AND SOLDER ALLOY THEREFOR

This application claims the priority of International Application No. PCT/DE2010/000919, filed Aug. 5, 2010, and German Patent Document No. 10 2009 036 405.6, filed Aug. 6, 2009, the disclosures of which are expressly incorporated by reference herein.

BACKGROUND AND SUMMARY OF THE INVENTION

The present invention relates to a method for repairing components of a gas turbine made of a super alloy as well as a corresponding solder alloy therefor.

A wide variety of methods for repairing components of a gas turbine and in particular components of gas turbines for use in aircraft (aircraft turbines) is known from the prior art. Example of these are described in U.S. Pat. No. 5,705,281, U.S. Pat. No. 5,561,827, U.S. Pat. No. 5,628,814, U.S. Pat. No. 6,503,349, EP 1 258 312 A2, WO 2007/031400 A1, EP 1 790 745 A1, U.S. Pat. No. 5,066,459, U.S. Pat. No. 5,182,080, U.S. Pat. No. 5,666,643, US 2005/0274009 A1, KR 1020010104662 A, EP 0 800 889 B1, US 2006/0134454 A1, GB 2 409 210 A, EE DE 699 20 257 T2, EP 1 197 290 A2, EP 1 818 132 A2, DE 32 37 776 C2, CA 2 496 189, CA 2 520 681, CA 2 581 908, US 2006/0174482 A1 and US 2006/013717 A1.

However, the disadvantage of the methods and repair materials described there is that for the most part, the repair materials are suitable only for specific substrate materials and have been coordinated for the materials, and involved individual processes must be carried out during the repair method to repair individual types of damage, making repair as a whole very expensive.

Therefore, the object of the present invention is providing a method for repairing components of a gas turbine, in particular an aircraft turbine, on the basis of super alloys, which can be carried out effectively and be used variably. Overall, the expense for executing repair work is supposed to be thereby reduced, wherein the quality of the repaired components is supposed to be maintained at a high level in accordance with requirements.

The invention proceeds from the knowledge that a simplified repair method may be provided for the different kinds of damage which may occur in the case of components of gas turbines, especially aircraft turbines, such as, for example, punctiform damage in the form of holes or the like, linear imperfections, such as cracks and the like, or planar defects, such as material removals, etc., in that the different kinds of damage are not repaired separately using individual methods, but together by using a common solder and/or a solder alloy for the repair. In doing so, the planar material removals are corrected by soldering on a molded repair part, while the punctiform or linear defects, such as holes, stripped cooling air holes, cracks and the like, are repaired by filling with the corresponding solder and/or the corresponding solder alloy. The solder and/or the solder alloy may therefore be used in a single work step for soldering on a molded repair part as well as for mending hole sites, stripped cooling air holes and cracks.

In the case of the present invention, solder alloy is understood to be an alloy, which has a NiCoCrAlY alloy and a Ni-based solder, while solder is understood merely as the Ni-based solder as a component having a low melting point. The NiCoCrAlY alloy supplies the required oxidation resistance and mechanical strength, while the Ni-based solder supplies the adhesive bond of solder alloy in the form of a matrix for the embedded NiCoCrAlY particles and for the component to be repaired.

The invention provides for making a molded repair part made of the solder alloy available for the repair of planar defects, such as, for example, in the case of a planar material removal, and for sealing additional punctiform or linear defects, such as cracks, holes and the like, by applying the solder and/or the solder alloy. The molded repair part in this case is also soldered on by the solder and/or the solder alloy, wherein, because the molded repair part is formed of the solder alloy, it is able to adhere directly to the substrate without additional application of the solder and/or the solder alloy. While the use of the Ni-based solder to connect the molded repair part to the component to be repaired or to fill in imperfections in the component to be repaired is conceivable, the use of the solder alloy is preferred, wherein the solder alloy in particular may be used both for sealing holes, cracks or small planar material removal and as the molded repair part, and wherein the molded repair part may in turn be soldered directly on a damaged planar spot without an additional binding agent, i.e., without additional solder or solder alloy. The solder alloys for the direct soldering of punctiform or linear imperfections and for the molded repair part may vary slightly with a basically similar composition with respect to the composition of elements and/or proportions. In particular, solder alloys may be used in which the same components or elements are included in slightly different proportions.

The component to be repaired that is correspondingly provided with solder and/or solder alloy or the molded repair part component is then subjected to a single heat treatment to form the solder connection, wherein both the molded repair part is soldered onto the component and the imperfections, which are filled with solder and/or solder alloy, are correspondingly tightly and securely sealed.

The solder alloy is aligned in such a way that both the Ni-based super alloys as well as the Co-based super alloys may be treated accordingly. As a result, universal use is possible in the case of gas turbines and in particular in the case of aircraft turbines.

The solder and/or the solder alloy may be applied to the component as a powder or powder mixture with or without a binding agent. Organic binding agents or other binding agents that evaporate or are removed by burning during the subsequent heat treatment for soldering may be considered as binding agents.

Accordingly, the molded repair part may be formed by a powder mixture of the solder alloy with or without binder, wherein corresponding techniques may be used for formation, such as, for example, pressing and the like.

The molded repair part may be applied as a corresponding green compact directly to the component to be repaired, or be sintered prior to application. In particular, a multi-stage temperature treatment process with different hold temperatures and hold periods may be provided as a sintering process.

In the same way, the heat treatment for forming the solder connection is a multi-stage heat-treatment process having different hold temperatures and hold periods.

The NiCoCrAlY alloy, which is used as a constituent of the solder alloy, may have a composition of 9 to 16% by weight, in particular 11 to 14% by weight and preferably 12.5 to 13% by weight aluminum, 18 to 25% by weight, in particular 20 to 24% by weight and preferably 22.5 to 23% by weight cobalt, 15 to 20% by weight, in particular 17 to 19% by weight and preferably 17.5 to 18% by weight chromium as well as 0.1 to 1% by weight, preferably 0.3 to 0.7% by weight and in particular 0.55 to 0.6% by weight yttrium. The remainder is formed by nickel and unavoidable impurities.

According to the invention, the Ni-based solder has at least a chromium content of 15% by weight and at least an iron and/or tungsten content of 15% by weight. The cobalt content may be limited to a maximum of 25% by weight. Due to the correspondingly high chromium content, there is good resistance to oxidation and corrosion.

The Ni-based solder, which is likewise a constituent of the solder alloy, may have a composition of 15 to 25% by weight, in particular 19 to 23% by weight and preferably 21.5 to 22% by weight iron and/or tungsten, a maximum of 10% by weight, preferably a maximum of 5% by weight, in particular a maximum of 2.5% by weight cobalt, 15 to 25% by weight, in particular 20 to 23% by weight and preferably 20.5 to 21% by weight chromium, 7 to 11% by weight, preferably 8 to 10% by weight and in particular 9 to 9.5% by weight molybdenum, 4 to 8% by weight, in particular 5 to 7% by weight and in particular 6 to 6.5% by weight silicon. The remainder is again formed by nickel and unavoidable impurities.

The NiCoCrAlY alloy and the Ni-based solder may be provided with proportions of 30 to 70% by weight of the NiCoCrAlY alloy, in particular with a proportion of 40 to 60% by weight in the solder alloy, while the Ni-based solder may have a weight proportion of 30 to 70% by weight and in particular 40 to 60% by weight. The solder alloy may preferably have a higher solder proportion for mending punctiform and/or linear imperfections, while the molded repair part may have a higher proportion of the NiCoCrAlY alloy.

Additional advantages, characteristics and features of the present invention will become clear from the following detailed description of exemplary embodiments on the basis of the enclosed drawings. In this case, the drawings show the following in a purely schematic manner:

BRIEF DESCRIPTION OF THE FIGURES

FIG. 1 is a perspective representation of a substrate;

FIG. 2 is a perspective representation of a substrate with a molded repair part;

FIG. 3 is a perspective representation of the molded repair part during application to the substrate;

FIG. 4 is a perspective representation of the substrate with the applied molded repair part;

FIG. 5 is a perspective representation of a turbine blade, which was repaired according to the present invention;

EXEMPLARY EMBODIMENTS

FIG. 1 shows a perspective representation of a substrate 1 made of Ni-based or Co-based super alloy, which is supposed to be repaired in accordance with the present invention. Understood as repair in this case is that a material removal on the surface of a component of a gas turbine is compensated for by a renewed application of material and/or punctiform or linear damage, such as, for example, cracks, holes and the like, are correspondingly filled in again. The substrate 1 shown in FIG. 1 is depicted as a square plate for the sake of simplicity, wherein, however, the gas turbine components to be repaired, in particular turbine blades or compressor blades which are shown in the exemplary embodiments in FIGS. 5 and 10, or turbine linings (shrouds) may have different shapes.

According to the present invention, a molded repair part 2 is produced to replace material from a planar material removal, the part being applied in the area on the component to be repaired, i.e., the substrate 1 in which the corresponding material removal occurred.

The molded repair part 2 is formed of a solder alloy, which comprises a component having a high melting point and a component having a low melting point, i.e., the actual solder. The component having the high melting point is formed by a NiCoCrAlY alloy, which has approximately a cobalt content of 22 to 23% by weight, a chromium content of approx. 17 to 18% by weight, an aluminum content of approx. 12 to 13% by weight and a yttrium content of approx. 0.5% by weight. The remainder is formed by nickel and unavoidable impurities, wherein of course the impurities are kept as low as possible.

The component having a low melting point is formed by a Ni-based solder, which has an iron content of 21 to approx. 22% by weight, a chromium content of approx. 21% by weight, a molybdenum content of approx. 9% by weight, a silicon content of approx. 6% by weight and a cobalt content of approx. 2.5% by weight. The remainder is again formed by nickel and unavoidable impurities.

The component having a high melting point, i.e., the NiCoCrAlY alloy, is present in the solder alloy in a proportion of approx. 60% by weight, while the alloy having a low melting point is present in a proportion of approx. 40% by weight.

Figure 6:
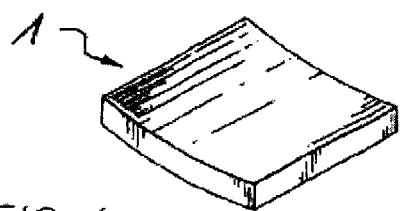
FIG. 6 is a perspective representation of a substrate according to FIG. 1.
Figure 7:
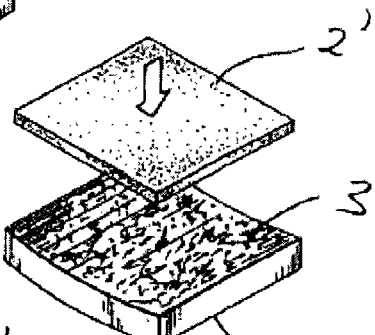
FIG. 7 is a perspective representation of the substrate and of a molded repair part, wherein the substrate is prepared for connection to the molded repair part.
Figure 8:
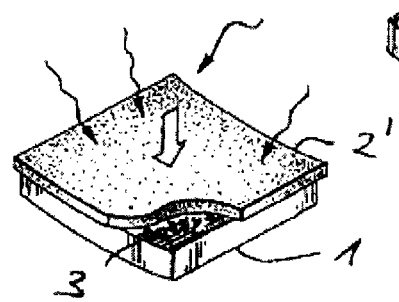
FIG. 8 is a perspective representation of the connection of the molded repair part to the substrate.

The molded repair part 2, also referred to as tape, may be formed by a wide variety of techniques. For example, the solder alloy may be present in powder form, which has a certain binding agent content, wherein the binding agent holds the powder particles of the solder alloy together and makes shaping possible. For example, the shaping may be accomplished by pressing. The molded repair part made of powder or powder with a binding agent and formed by pressing may be designated as a green compact. A binder may be formed for example of an organic material, which burns or evaporates without leaving any residue during the subsequent heat treatment for soldering on the molded repair part or during an upstream sintering treatment. For example, the molded repair part 2 may be pressed from the powdery solder alloy and the binding agent in a corresponding mold, wherein the green compact that is produced thereby may be provided directly for application to the substrate, as shown in FIGS. 2 and 3. In this case, only a soldering process for applying the green compact takes place. Alternatively, a sintering treatment of the green compact may additionally be provided so that, after a sintering treatment of the green compact, the molded repair part is applied as a sintered molded part in a soldering process, as shown in FIGS. 7 and 8. During sintering, in addition to outgassing the binder from the green compact, an adhesive bond occurs partially, exclusively or predominantly due to solid-state reactions based on diffusion processes.

FIGS. 2 and 3 show that the molded repair part 2 is applied as a green compact directly on the substrate 1, wherein FIG. 3 shows that, through the effect of temperature (see wavy arrows), the component of the solder alloy having a low melting point, i.e., the nickel-based solder, melts and by forming liquid phases produces an adhesive bond between the molded repair part 2 and the substrate 1. At the same time, a connection of the powder particles of the molded repair part 2 occurs with simultaneous removal of the binding agent content so that a firmly adhering coating is produced on the substrate 1 (see FIG. 4).

A correspondingly repaired component in the form of a turbine blade is depicted in FIG. 5. The turbine blade 10 has molded repair parts 21 or 20 applied to the tip 12 as well as to the leading edge 11 respectively, which were applied to the turbine blade 10 according to the procedure described on the basis of FIGS. 1 to 4.

In addition, a crack 15 is depicted in FIG. 5, which was also sealed by applying the powdery solder alloy 30 and subsequent soldering.

According to the invention, a complete repair of the turbine blade 10 may be carried out by a single heat-treatment process to which the turbine blade 10 is subjected, in that, for example, corresponding molded repair parts 20, 21 are applied to the areas of the turbine blade 10 that have experienced a material removal, e.g., the leading edge 11 and the blade tip 12, and the solder alloy is applied directly to other areas where punctiform or linear imperfections, such as, for example, holes or cracks, are present such that, with the common heat treatment, the molded repair parts are soldered on and the punctiform or linear imperfections are directly sealed by the solder alloy.

The solder alloy 30, as defined and described above, may be applied in the form of a paste, as a molded part or in any other suitable form on and/or in the crack 15 by direct penetration of the powdery solder alloy or by using a binding agent in a type of paste, a molded part or the like by painting, smoothing, spraying or in any other suitable manner.

The heat treatment of the component to be repaired, e.g., the turbine blade, as depicted in FIG. 5, takes place in a multi-stage heat-treatment process, wherein for example several holding stages at different temperatures are provided. Thus, to begin with, a heating to a first temperature in the range of 450° C. to 500° C. may take place, for example, followed by a hold time, e.g., of 10 to 60 minutes, at this temperature. Then, a further heating to a second temperature in the range of approx. 600° C. to 1000° C. may take place, followed again by a hold time, e.g., of 10 to 60 minutes. The heating periods in this case may move in the range of a quarter hour to 2 hours. Then the component may be heated further to 1250° C. to 1270° C. and be kept there for a specific time, e.g., one half hour to two hours. Afterwards, the component may be cooled to below 1080° C. at a cooling rate of at least 20° C. per minute. Subsequently, the component may be cooled to below 650° C. at a cooling rate of at least 20° C. per minute. The further cooling to room temperature may take place at any cooling rate. Following this cooling process, a three-stage heat treatment may be carried out.

In a first step of the heat treatment, a heating, e.g., to a temperature of 1100° C. to 1150° C., may take place, followed by a longer hold time at this temperature, e.g., of four to eight hours. The heating periods in this case may move in the range of a quarter hour to two hours. Following this, a cooling to below 650° C. may take place at a cooling rate of at least 20° C. per minute. The further cooling to room temperature may in turn be carried out at any cooling rate.

In the second step of heat treatment, which may take place for example in conjunction with a coating process, e.g., aluminizing, a heating, e.g., to a temperature of 1050° C. to 1100° C. may take place, followed by a longer hold time at this temperature e.g., of four to eight hours. The heating periods in this case may move in the range of one half hour to two hours. The cooling to room temperature may in turn be carried out at any cooling rate.

In a third and final step of the heat treatment, a heating, e.g., to a temperature of 850° C. to 950° C. may take place, followed in turn by a longer hold time at this temperature, e.g., of two to six hours. The heating periods in this case may move in the range of one half hour to 1.5 hours. The cooling to room temperature may in turn be carried out at any cooling rate.

The entire heat treatment may be carried out in a vacuum furnace or under inert gas, such as, for example, argon. Even the cooling may be carried out both in a vacuum as well as with rapid cooling with the use of inert gas, such as, for example, argon cooling gas.

Similar to FIGS. 1 to 5, FIGS. 6 to 10 show an alternative implementation of the method according to the invention. Identical components in this case are provided with the same reference numbers so that repeating a description for these components is superfluous.

As FIG. 7 shows, instead of the molded repair part 2 in the form of a green compact, as in FIG. 2, a sintered repair part 2' is used, in which the solder alloy from which the molded repair part 2' is formed has already been joined to the molded repair part in an upstream sintering process.

A corresponding molded repair part 2' may be formed for example without binding agent in a mold of the powdery solder alloy, because a dimensionally stable molded repair part 2' may be formed from the powder by the sintering process. The sintering process may again be formed by a multi-stage heat-treatment method, wherein several temperature stages are passed through, e.g., at 300° C., 600° C. and 1,100° C., and the powder is slowly heated to these temperatures and kept at the individual temperature stages respectively for a specific time, in the range of 10 minutes to 60 minutes, in order to form a connection of the powder particles and a dimensionally stable molded repair part 2' by an outgassing of the binder and by diffusion processes. After a brief hold period of, for example, 10 minutes to 120 minutes at the highest temperature stage, the molded repair part may solidify into the molded repair part 2' by corresponding rapid cooling under inert gas, such as argon, or correspondingly slow furnace cooling.

The sintered molded repair part 2' may be soldered directly on the substrate 1 without additional expedients or by means of the solder alloy 3 that is applied to the substrate 1. The solder alloy 3 in this case may be spread in powder form or by using a binding agent or be applied another suitable manner.

In addition, the molded repair part, be it as a green compact or in sintered form, may be arranged by other suitable fixation methods on the site to be repaired, such as e.g., by other bonding or tacking methods, such as e.g., ball spot welding, condenser spot welding, the use of binders/cement etc., before it is firmly soldered.

Figure 9:
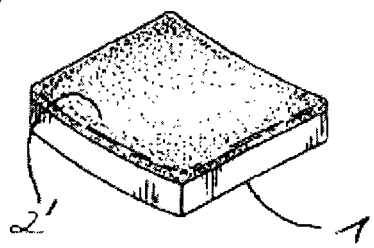
FIG. 9 is a perspective representation of the substrate with the connected molded repair part according to the representations in FIGS. 6 to 8.

As shown in FIG. 8, the sintered molded repair part 2' is soldered on by means of the thin layer made of solder alloy 3, which is applied to the substrate 1, with the effect of temperature so that a firm connection results between the molded repair part 2' and substrate 1 (see FIG. 9).

Correspondingly, it is also possible according to this procedure, as depicted in FIGS. 6 to 9, to provide a corresponding component of a gas turbine, such as, for example, a turbine blade or a turbine lining (shroud), with corresponding molded repair parts 20' and 21' on the leading edge 11 or the blade tip 12. In this case as well, punctiform or linear damage, such as holes, cracks and the like, may be filled and sealed by means of directly applied solder alloy 30.

Figure 10:
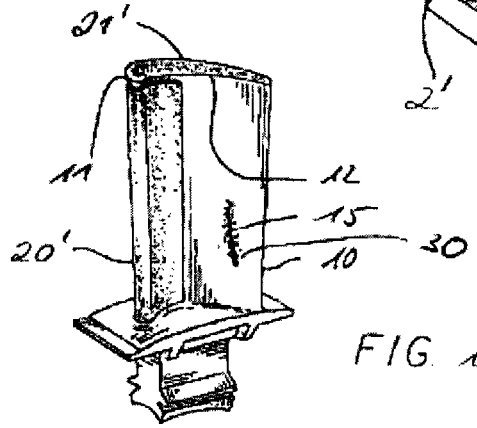
FIG. 10 is a perspective representation of a turbine blade, which was repaired according to the present invention in accordance with embodiments 6 to 9.

The correspondingly repaired components, such as, for example, the turbine blades 10 from FIGS. 5 and 10 as well as the corresponding turbine linings (shrouds), may be subsequently post processed, i.e., after the application of the molded repair parts or the solder alloy, in order adjust the precise contour and shape of the components. To do this, machining methods, such as grinding, boring, milling and the like, in particular also laser material processing or chemical removal methods, may be used. In particular, closed cooling channels or cooling air holes may be uncovered again or opened and the flow path surface may be readjusted. In addition, corresponding layers, such as oxidation and/or anti-corrosive layers, may be reapplied to the repaired components, e.g., by aluminizing and the like.

Prior to repair, the surface of the component to be repaired may be prepared, for example, by impacting with particles, such as, for example, SiC particles or the like.

Although the present invention was described in detail based on the exemplary embodiments, it is self-evident to a person skilled in the art that the invention is not limited to these embodiments, but that in fact variations and modifications are possible without leaving the protective scope that is defined by the enclosed claims. In particular, modifications may be undertaken by omitting individual features or by a different combination of the features presented. The present invention includes in particular all combinations of all features presented.

The invention claimed is:

1. A method for repairing a component of a gas turbine, comprising the steps of:

applying a solder alloy to the component in an area of the component having a punctiform damage or a linear imperfection, wherein the solder alloy is a mixture of a NiCoCrAlY alloy and a Ni-based solder;

applying a molded repair part made of the solder alloy to the component in an area of the component having a planar defect;

heat treating the component to solder the molded repair part on the component and to solder the solder alloy applied to the component in the area of the component having the punctiform damage or the linear imperfection;

cooling the component after the heat treating; and following the cooling, further heat treating the component wherein the further heat treating includes three sequences of a cooling and a heating.

2. The method according to claim 1, wherein the cooling of the component cools the component to room temperature.

3. The method according to claim 1, further comprising an additional heat treating step for coating the component in addition to the three sequences of the cooling and heating.

4. The method according to claim 1, wherein the component is formed of a Ni-based or Co-based super alloy.

5. The method according to claim 1, wherein the molded repair part is a green compact.

6. The method according to claim 1, wherein the molded repair part is a sintered molded repair part.

* * * * *